United States Patent
Kanki et al.

(10) Patent No.: US 7,181,369 B2
(45) Date of Patent: Feb. 20, 2007

(54) METHOD AND SYSTEM FOR ADMINISTERING AUTOMATIC DOOR APPARATUS, AND AUTOMATIC DOOR APPARATUS

(75) Inventors: Hisayuki Kanki, Akashi (JP); Hiroyuki Inoue, Miki (JP); Toru Iriba, Kobe (JP)

(73) Assignee: Nabco, Ltd. (JP)

( * ) Notice: Subject to any disclaimer, the term of this patent is extended or adjusted under 35 U.S.C. 154(b) by 61 days.

(21) Appl. No.: 10/658,893

(22) Filed: Sep. 10, 2003

(65) Prior Publication Data

US 2004/0049319 A1  Mar. 11, 2004

(51) Int. Cl.
  *G06F 11/00* (2006.01)
(52) U.S. Cl. ................. 702/188; 702/182
(58) Field of Classification Search ........... 340/3.1; 700/1, 9, 65, 108, 275, 277, 301–306; 702/127, 702/188, 182
  See application file for complete search history.

(56) References Cited

U.S. PATENT DOCUMENTS 5,884,237 A * 3/1999 Kanki et al. ............ 702/113
6,392,537 B1 * 5/2002 Tazumi et al. .......... 340/507
6,792,321 B2 * 9/2004 Sepe, Jr. ................ 700/65
2004/0049319 A1 * 3/2004 Kanki et al. ............ 700/275

FOREIGN PATENT DOCUMENTS

JP  2003-150995  * 5/2003
JP  2004-068287  * 3/2004

* cited by examiner

*Primary Examiner*—John Barlow
*Assistant Examiner*—Douglas N. Washburn
(74) *Attorney, Agent, or Firm*—Gerald E. Hespos; Anthony J. Casella

(57) ABSTRACT

Disclosed is a system for monitoring automatic door apparatuses installed at different sites by centrally administering maintenance service contents and contents regarding actual repair to compile a database and by rendering personnel in sales agents or maintenance service agents accessible to the database. The system has a multitude of automatic door apparatus each having a communications function, and an administration center communicatively connected with the respective automatic door apparatuses via a communication medium. Each of the automatic door apparatuses sends, to the administration center, operating information of its own with apparatus identification information attached thereto. The administration center is operative to classify the operating information of each door apparatus into a number of categories based on the apparatus identification information for storage, and to output the operating information in response to a calling.

17 Claims, 13 Drawing Sheets

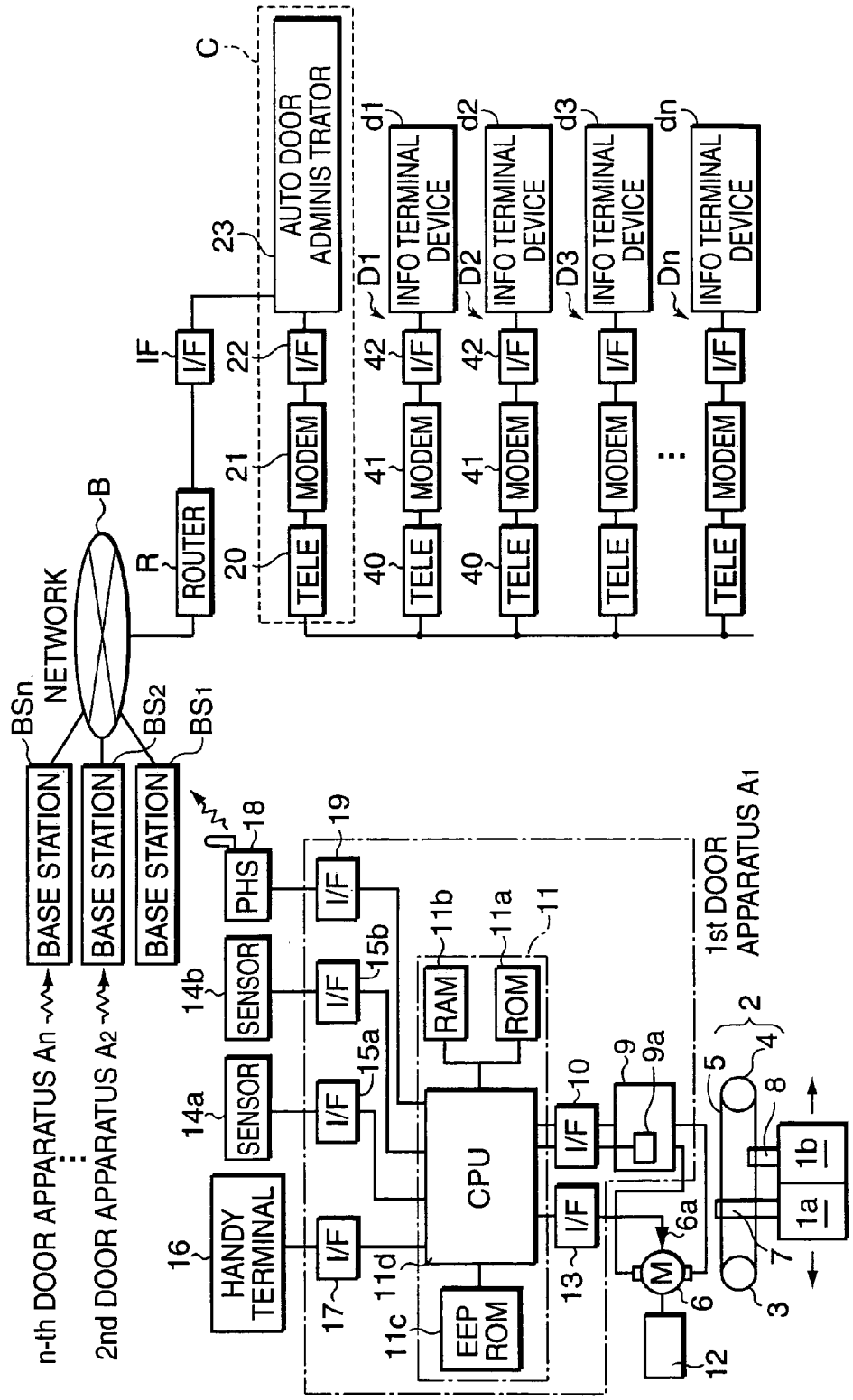

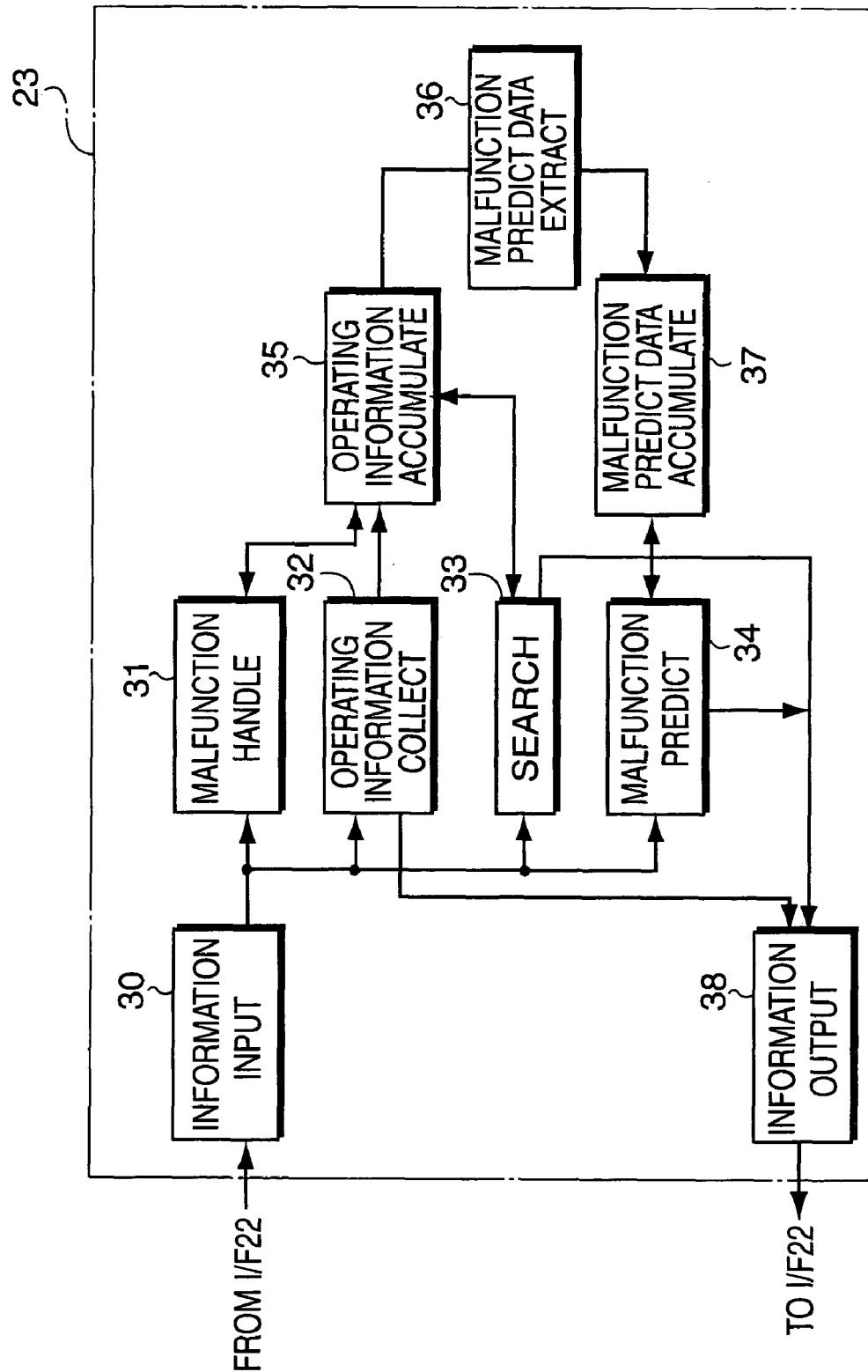

FIG.4A

| OCCURRENCE OF ABNORMALITY |
|---|

⚠ ABNORMALITY TOOK PLACE
DATE & TIME: YY/MM/DD hr:min
DOOR APPARATUS ID NO.: 123456789
CONTENTS OF ABNORMALITY: BELT BREAKAGE

| SPECIFIC DOOR INFORMATION | OPERATION HISTORY | HANDLING CASE | CLIENT INFORMATION | CONTACT MAINTENANCE AGENT | CONTENTS OF DIAGNOSIS |
|---|---|---|---|---|---|

ENGINE TYPE                           DS-21-N
DOOR TYPE                             SLIDE DOOR
INSTALLATION DATE                     YY/MM/DD
PERSONNEL IN CHARGE OF INSTALLATION   AA
FINAL CHECKUP DATE                    YY/MM/DD
CHECKUP CONTENTS                      PERIODIC CHECKUP
FINAL CHECKUP PERSONNEL               BB
MANUFACTURER
REMARKS

[DETAIL INFORMATION]

FIG.4B

OPERATION HISTORY

| DATE & TIME | OPERATION | RESULT |
|---|---|---|
| YY/MM/DD hr:min | START | SELF-CHECK CLEARED |
| YY/MM/DD hr:min | STOP | |
| YY/MM/DD hr:min | START MAINTENANCE MODE | |
| YY/MM/DD hr:min | FINISH MAINTENANCE MODE | |
| YY/MM/DD hr:min | START | SELF-CHECK CLEARED |
| YY/MM/DD hr:min | STOP | |
| YY/MM/DD hr:min | START | SELF-CHECK CLEARED |
| YY/MM/DD hr:min | STOP | |
| YY/MM/DD hr:min | START | SELF-CHECK CLEARED |
| YY/MM/DD hr:min | STOP | |

[RESET]                              [OPERATING INFORMATION]

FIG.4C

HANDLING CASE

EXAMPLES OF HANDLING PROBLEM OF BELT BREAKAGE 1. xxxxxxxxxxxxxxxxx
  2. xxxxxxxxxxxxxxxxx
  3. xxxxxxxxxxxxxxxxx

FIG.5A

OPERATING INFORMATION

OPERATING INFORMATION MAIN SEARCH

SEARCH KEYWORD

| | | |
|---|---|---|
| ENGINE TYPE | DS-21-N ▼ | — 50a |
| CLIENT NAME | ALL ▼ | — 50b |
| AREA | ALL ▼ | — 50c |
| BUILDER | ALL ▼ | — 50d |
| INSTALLATION YEAR | 1999 ▼    NOW ▼ | — 50e |

[START SEARCH]

SEARCH RESULT

| ENGINE TYPE | AREA | CLIENT NAME | INSTALLATION YEAR |
|---|---|---|---|
|  |  |  |  |
|  |  |  |  |
|  |  |  |  |
|  |  |  |  |
|  |  |  |  |

} 50f

[PRINT SEARCH RESULT]  [END]

FIG.5B

OPERATING INFORMATION

DOOR APPARATUS ID NO.123456789

OPERATING INFORMATION MAIN SEARCH

| SPECIFIC DOOR INFORMATION | OPERATION HISTORY | MAINTENANCE HISTORY | CLIENT INFORMATION |
|---|---|---|---|

DOOR APPARATUS ID NO.    123456789
ENGINE TYPE              DS-21-N
DOOR TYPE                SLIDE DOOR
INSTALLATION DATE        YY/MM/DD
PERSONNEL IN CHARGE OF INSTALLATION   AA
MANUFACTURER
REMARKS                  ▼ — 51a        — 51b
DESIGNATED VALUE

[PRINT] [CATALOG INFORMATION]

[CLOSE]

FIG.6A

| | MAINTENANCE HISTORY | | | | | | |
|---|---|---|---|---|---|---|---|
| SEARCH PERIOD | 1997 ▼ | 01 ▼ | 01 ▼ 〜52a | ~ | 1997 ▼ | 01 ▼ | 01 ▼ 〜52b |

| DATE & TIME | HANDY TERMINAL NO. | REPORT NO. |
|---|---|---|
| YY/MM/DD hr:min | | MR1234 |
| YY/MM/DD hr:min | | MR1235 |

PRINT

FIG.6B

| | OPERATION HISTORY | | | | | | |
|---|---|---|---|---|---|---|---|
| SEARCH PERIOD | 1997 ▼ | 01 ▼ 〜53a | 01 ▼ | ~ | 1997 ▼ | 01 ▼ | 01 ▼ 〜53b |
| DISPLAY CONTENTS | ALL ▼ | | | | | | |

| DATE & TIME | OPERATION | RESULT |
|---|---|---|
| YY/MM/DD hr:min | START | SELF-CHECK CLEARED |
| YY/MM/DD hr:min | STOP | |
| YY/MM/DD hr:min | START MAINTENANCE MODE | |
| YY/MM/DD hr:min | FINISH MAINTENANCE MODE | |
| YY/MM/DD hr:min | START | SELF-CHECK CLEARED |
| YY/MM/DD hr:min | STOP | |
| YY/MM/DD hr:min | START | SELF-CHECK CLEARED |
| YY/MM/DD hr:min | STOP | |
| YY/MM/DD hr:min | START | SELF-CHECK CLEARED |
| YY/MM/DD hr:min | STOP | |

DETAIL   PRINT

FIG.8A

OPERATING INFORMATION

MALFUNCTION PREDICT MAIN SEARCH

SEARCH KEYWORD

| | | |
|---|---|---|
| ENGINE TYPE | DS-21-N ▼ | 60a |
| EMERGENCY | MAXIMUM ▼ | 60b |
| AREA | ALL ▼ | 60c |
| SEARCH PERIOD | JANUARY, 2001 ▼  MARCH, 2001 ▼ | 60d |
| | START SEARCH | 60e |

SEARCH RESULT

| ENGINE TYPE | AREA | CLIENT NAME | INSTALLATION YEAR |
|---|---|---|---|
| | | | |
| | | | |
| | | | |
| | | | |
| | | | |
| | | | |

60f

[PRINT SEARCH RESULT]  [END]

FIG.8B

OPERATING INFORMATION

DOOR APPARATUS ID NO.123456789

MALFUNCTION PREDICT MAIN SEARCH

| SPECIFIC DOOR INFORMATION | OPERATION HISTORY | MAINTENANCE HISTORY | CLIENT INFORMATION | PREDICT CONTENTS |
|---|---|---|---|---|

DOOR APPARATUS ID NO.    123456789
ENGINE TYPE    DS-21-N
DOOR TYPE    SLIDE DOOR
INSTALLATION DATE    YY/MM/DD
PERSONNEL IN CHARGE OF INSTALLATION    AA
MANUFACTURER
REMARKS
DESIGNATED VALUE [ ▼] [ ]

[PRINT] [CATALOG INFORMATION]

[CLOSE]

FIG.9A

OPERATION HISTORY

SEARCH PERIOD [1997 ▼] [01 ▼] [01 ▼] ~ [1997 ▼] [01 ▼] [01 ▼]

DISPLAY CONTENTS [ALL ▼]

| DATE & TIME | OPERATION | RESULT |
|---|---|---|
| YY/MM/DD hr:min | START | SELF-CHECK CLEARED |
| YY/MM/DD hr:min | STOP | |
| YY/MM/DD hr:min | START MAINTENANCE MODE | |
| YY/MM/DD hr:min | FINISH MAINTENANCE MODE | |
| YY/MM/DD hr:min | START | SELF-CHECK CLEARED |
| YY/MM/DD hr:min | STOP | |
| YY/MM/DD hr:min | START | SELF-CHECK CLEARED |
| YY/MM/DD hr:min | STOP | |
| YY/MM/DD hr:min | START | SELF-CHECK CLEARED |
| YY/MM/DD hr:min | STOP | |

[DETAIL] [PRINT]

FIG.9B

MAINTENANCE HISTORY

SEARCH PERIOD [1997 ▼] [01 ▼] [01 ▼] ~ [1997 ▼] [01 ▼] [01 ▼]

| DATE & TIME | HANDY TERMINAL NO. | REPORT NO. |
|---|---|---|
| YY/MM/DD hr:min | | MR1234 |
| YY/MM/DD hr:min | | MR1235 |

[PRINT]

FIG.9C

PREDICT CONTENTS

| PREDICT CONTENTS | WITHIN 1 WEEK | WITHIN 1 MONTH | WITHIN 3 MONTHS | WITHIN 6 MONTHS |
|---|---|---|---|---|
| PROBABILITY OF NOISE DUE TO DOOR GEAR ABRASION | 20% | 30% | 60% | 100% |
| PROBABILITY OF NOISE DUE TO RAIL ABRASION | 5% | 20% | 40% | 60% |
| ⋮ | | | | |

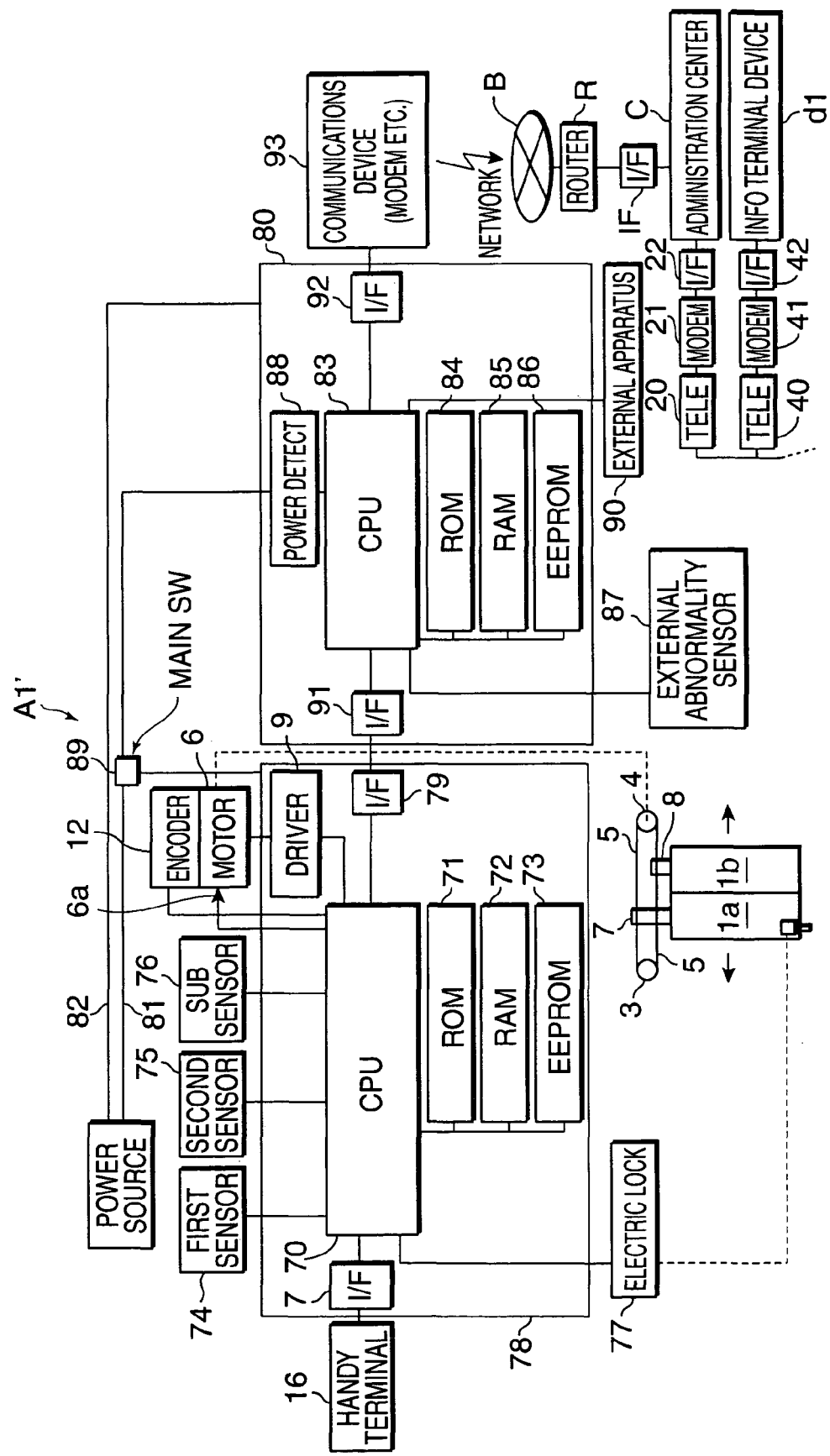

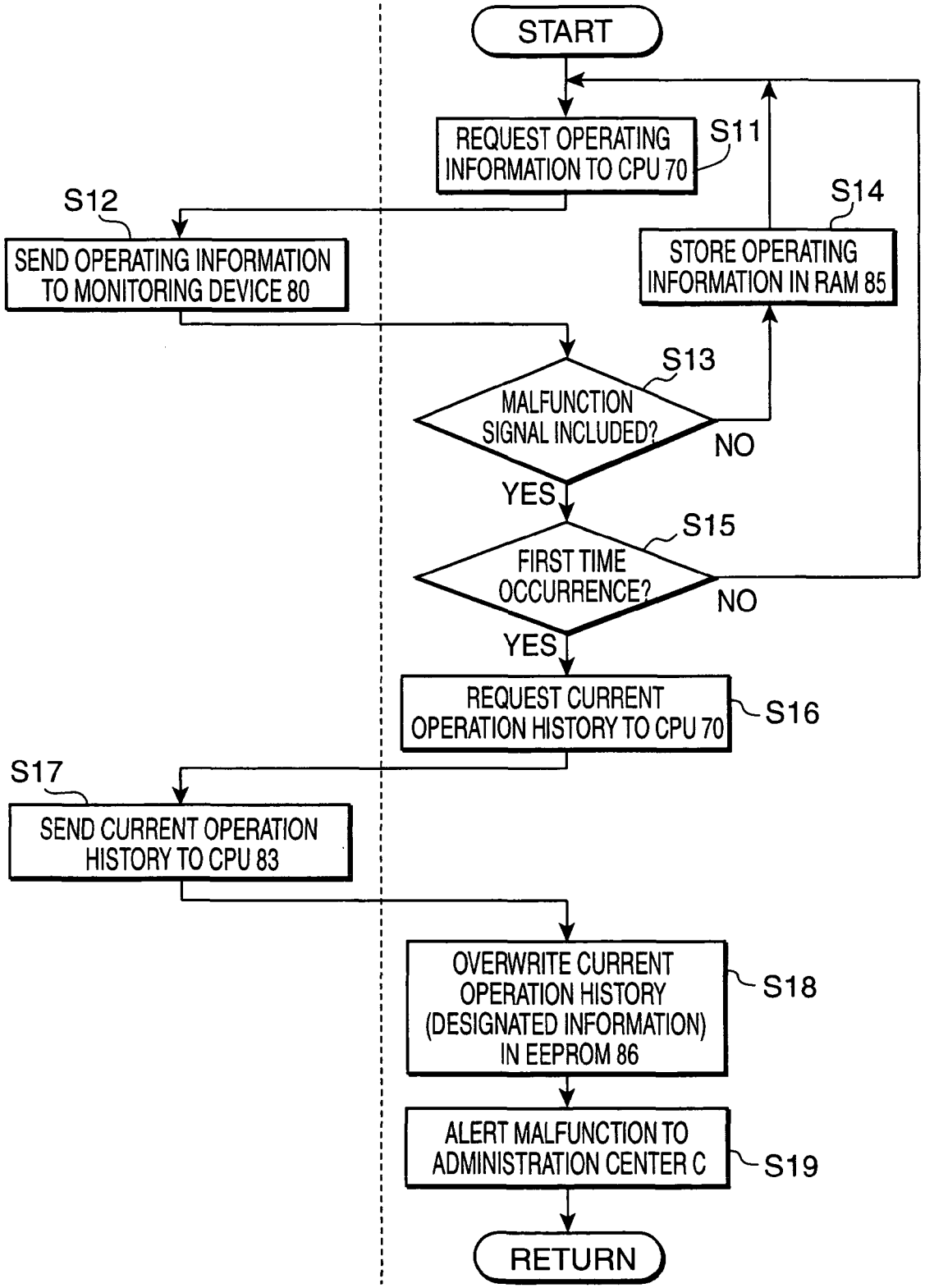

FIG.12

| SAFETY RETURN NO. | 6 |
|---|---|
| TEMPERATURE SENSOR OPERATED NO. | 1 |
| CHECKUP NO. | 5 |
| DOOR OPEN/CLOSE NO. | 5617 |
| CPU RESET NO. | 1 |

FIG.13

| OPENING SPEED (0~7) | 7 |
|---|---|
| CLOSING SPEED (0~7) | 7 |
| OPEN TIMER (0~3) | 1 |
| START TORQUE (0~3) | 7 |
| BRAKE TORQUE (0~3) | 7 |
| INVERSE TORQUE | 5 |
| OPEN CUSHION SPEED (0~3) | 2 |
| CLOSE CUSHION SPEED (0~3) | 2 |

| FULL-OPEN STROKE (0~100) | 92 |
|---|---|
| HALF-OPEN STROKE (0~100) | 50 |

METHOD AND SYSTEM FOR ADMINISTERING AUTOMATIC DOOR APPARATUS, AND AUTOMATIC DOOR APPARATUS

This application is based on Japanese Patent Application Nos. 2001-182356 and 2001-284815 filed on Jun. 15, 2001 and Sep. 19, 2001, respectively, the contents of which are hereby incorporated by references.

BACKGROUND OF THE INVENTION

1. Field of the Invention

This invention relates to a method and system for administering automatic door apparatuses adapted for maintenance of the automatic door apparatuses, and to an automatic door apparatus.

2. Description of the Related Art

An arrangement of a conventional automatic sliding door system is described. The conventional automatic sliding door system comprises a pair of slidable door panels disposed in a doorway of a building, an open/close mechanism for opening and closing the door panels, an open/close controlling unit for controlling the open/close mechanism, and a sensor for detecting approach and leave of a passerby toward and away from the door panels.

When the sensor detects a passerby, a detection signal is sent to the open/close controlling unit. In response to the detection signal, the open/close controlling unit drives a motor of the open/close mechanism to circulate an endless belt stretched around a drive pulley and a driven pulley.

The door panels suspend from an upper section or upper belt and a lower section or lower belt of the endless belt via hangers which travel along guide rails, respectively. The door panels slide toward and away from each other as the door panels are respectively guided along the upper belt and the lower belt which run back and forth in opposite directions, thereby opening and closing the doorway.

In the above-constructed automatic door system, a wear-out component such as a roller which is mounted on a hanger and rolls along the guide rails is replaced with a new one at the time of maintenance. Repair is conducted each time when malfunction such as breakage of a belt takes place.

If the automatic door system encounters malfunction, a service personnel is dispatched for repair from a maintenance station such as a sales agent (or maintenance service agent) upon receiving report of the malfunction from the builder who constructed the automatic door system or an equivalent source.

If the automatic door system to be repaired has a self-diagnosing function, a service personnel is informed of a self-diagnosis result through the display section of his or her handy terminal by electrically connecting the handy terminal with an external connecting terminal of the automatic door system. Thereby, the service personnel can grasp the contents on the malfunction (see, e.g., U.S. Pat. No. 5,884,237).

Self-diagnosing function is generally such that the automatic door system itself diagnoses malfunction or abnormality of its own with use of a sensor or its equivalent, and stores a result on diagnosis in a storage unit in the automatic door system. There is known a remote monitoring system for an automatic door system (as disclosed in U.S. Pat. No. 6,392,537), in which remote monitoring of an automatic door system is executable by transmitting a self-diagnosis result on the automatic door system to an external device via a communications line.

In the automatic door system disclosed in the latter publication, each controller of a plurality of automatic door systems is connected with a dedicated terminal device serving as a maintenance station via a communications line, and information as to which automatic door system encountered malfunction is transmitted to the maintenance station, along with a self-diagnosis result indicating a malfunctioned part of the automatic door system when abnormality is alerted.

In this way, efficiency on maintenance service and repair of automatic door systems has been improved.

After the actual repair, the service personnel brings back the contents on the maintenance service and repair in the form of a note or memorandum to the sales agent (or maintenance service agent) from where the service personnel has been dispatched. Thus, the histories on the maintenance service and repair regarding the automatic door systems are administered individually among the sales agents (or maintenance service agents).

In the above system, however, merely specific personnel or staff members in the sales agent are authorized to browse the contents on the maintenance service and repair. Further, generally, since the histories on the maintenance service and repair are filed in the format of monthly printed matters, a service personnel is required to manually search the relevant history on repair of the target automatic door system which the service personnel is requested to repair among a heap of files, which is a cumbersome operation. Therefore, in most of the cases, the service personnel utilizes merely a most recent history on repair. Thus, the histories on maintenance service and repair have not been fully utilized, thereby hindering improvement in efficiency on maintenance service and repair.

The conventional automatic door system has suffered from another problem. The external light is likely to be incident on an optical sensor for detecting a passerby during a specific time zone, which may likely to give rise to erroneous operation of the sensor. When malfunction is detected due to such an erroneous operation of the sensor, it is difficult to determine the cause of the malfunction if the storage unit does not have recorded information that the mounting angle of the sensor has been adjusted with respect to the specific automatic door system, as a repair history.

Thus, it is highly likely that a sales agent with poor storage of repair history may fail to accurately determine some of the causes of malfunctions even if the automatic door system is equipped with a self-diagnosing function.

Further, the contents on maintenance service and repair are useful information for manufacturers of automatic door systems as well as for the sales agents and maintenance service agents in development of the automatic door systems. Therefore, there is a demand for constructing a system in which the contents on maintenance and repair concerning automatic door systems are collected and centrally administered, and a database storing the contents is freely accessible from various personnel involved in the automatic door systems. By constructing such a system, malfunction of an automatic door system can be diagnosed integrally from various points of view, and a possible malfunction can be predicted based on an analysis on phenomena associated with a specific malfunction.

Furthermore, in the conventional door system equipped with the self-diagnosing function, the door controlling unit is designed to automatically perform self-diagnosis in response to actuation of the temperature sensor mounted on the motor surface, if abnormality such as an overheated state of the motor took place, for example. In such an occasion, the cause of the overheated state of the motor cannot be determined despite of easy identification of the malfunctioned part. Thus, the automatic door system equipped with the self-diagnosing function fails to provide a fundamental solution for eliminating the cause of the malfunction.

SUMMARY OF THE INVENTION

It is an object of this invention to provide a method and system for administering automatic door apparatuses, and an automatic door apparatus which have overcome the problems residing in the prior art.

It is another object of this invention to provide a method and system for administering automatic door apparatuses that enable to centrally administer maintenance contents, repair contents, and the like of automatic door apparatuses installed at various locations to compile a database, to render personnel in sales agents and maintenance service agents accessible to the database for prompt reference and exchange of necessary maintenance information, to predict a possible malfunction based on the collected maintenance contents, repair contents, and the like, and to improve efficiency on maintenance service.

According to an aspect of the invention, each of a multiple of automatic door apparatuses installed at different locations sends, to an administration center, operating information of its own with apparatus identification information attached thereto. The administration center classifies the operation information in accordance with the apparatus identification information, and stores the classified operation information for output of the stored operating information depending on a calling condition.

These and other objects, features and advantages of the present invention will become more apparent upon reading of the following detailed description along with the accompanying drawings.

BRIEF DESCRIPTION OF THE DRAWINGS

FIG. 1 is a block diagram showing an entire arrangement of an automatic door apparatus administering system as an embodiment of this invention.

FIG. 2 is a block diagram showing an arrangement of an automatic door administration device shown in FIG. 1.

FIG. 4A is an illustration showing an example of a main screen to be displayed on a display device of an administration center when abnormality occurred in an automatic door apparatus.

FIG. 4B is an illustration of a screen showing an example of an operation history of an automatic door apparatus.

FIG. 4C is an illustration of a screen showing an example of handling malfunction.

FIG. 5A is an illustration showing an example of an operating information search main screen.

FIG. 5B is an illustration showing an example of an operating information search detail screen.

FIG. 6A is an illustration showing an example of a maintenance history screen in the operating information search detail screen.

FIG. 6B is an illustration showing an example of an operation history screen in the operating information search detail screen.

FIG. 8A is an illustration showing an example of a malfunction predict search main screen.

FIG. 8B is an illustration showing an example of a malfunction predict search detail screen.

FIGS. 9A through 9C are illustrations showing examples of an operation history screen, a maintenance history screen, and a malfunction predict screen in the malfunction predict search detail screen, respectively.

FIG. 10 is a block diagram showing an entire arrangement of an automatic door apparatus equipped with a malfunction monitoring function as another embodiment of this invention.

FIG. 11 is a flowchart showing a control operation of an automatic door monitoring device shown in FIG. 10.

FIG. 12 is an illustration showing contents on an operation history to be sent to an EEPROM provided in the monitoring device in FIG. 10.

FIG. 13 is an illustration showing contents on designated information to be sent to the EEPROM provided in the monitoring device in FIG. 10.

DETAILED DESCRIPTION OF THE PREFERRED EMBODIMENTS

Figure 3B:
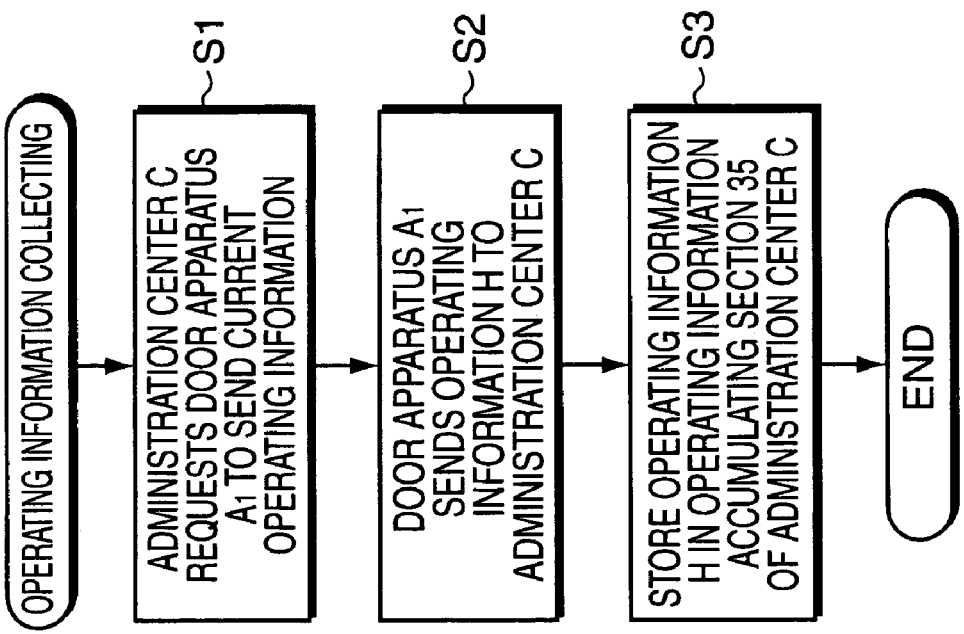
FIGS. 3A and 3B are flowcharts showing operations of collecting operating information in the case where power is always kept in an on-state and the case where power is regularly turned on and off according to a predetermined schedule, respectively.

A preferred embodiment of this invention is described with reference to FIGS. 1 through 9C. Referring to FIG. 1, an automatic door apparatus administering system (hereinafter, simply called as "administration system") primarily includes: a number of automatic door apparatuses $A_1$ through $A_n$; base stations $BS_1$ through $BS_n$ communicatively connected with the respective automatic door apparatuses $A_1$ through $A_n$; an automatic door apparatus administration center C (hereinafter, simply called as "administration center C") communicatively connected with the base stations $BS_1$ through $BS_n$, via a network B, a router R, and an interface IF; and maintenance stations $D_1$ through $D_n$ communicatively connected with the administration center C via the Internet or public telephone lines 40.

Examples of the maintenance stations $D_1$ through $D_n$ include a sales agent in charge of installation of the relevant automatic door apparatus, or a maintenance service agent which has contracted to perform maintenance service on the installed automatic door apparatus.

The administration center C may be a department of the manufacturer that produced the relevant automatic door apparatus, for example.

First, the arrangement of the automatic door apparatus $A_1$ which is communicatively connected with the base station $BS_1$ via radio transmission is described.

The automatic door apparatus $A_1$ is designed such that door panels 1a, 1b disposed in a doorway of a building are opened and closed by an open/close mechanism 2.

The open/close mechanism 2 includes a belt 5 stretched around a drive pulley 3 and a driven pulley 4, and a motor 6 for rotating the drive pulley 3. The door panel 1a is indirectly connected with an upper part of the belt 5 by a hanger 7, whereas the door panel 1b is indirectly connected with a lower part of the belt 5 by a hanger 8. The door panels 1a, 1b slide toward and away from each other by rotating the motor 6 in forward and backward directions alternately.

The rotating direction and the rotating speed of the motor 6 are controlled by a motor drive unit 9. The motor drive unit 9 is driven upon receiving a control signal from a control unit 11 electrically connected to the drive unit 9 via an input/output interface 10. The rotating direction of the motor 6 is changeable by altering the polarity of the motor 6, and the rotating speed of the motor 6 is changeable by altering the voltage to be applied to the motor 6.

The rotary shaft of the motor 6 is coupled to an encoder 12 to detect the rotating speed of the motor 6 and to feedback control the motor 6 by feeding a detection signal indicating the rotating speed of the motor 6 back to the control unit 11 by way of an input/output interface 13.

The motor drive unit 9 is provided with a motor current monitoring section 9a for monitoring the electric current running through the motor 6. The motor 6 is provided with a motor temperature monitoring section 6a for detecting the temperature of the motor 6. Signals sent from the motor temperature monitoring section 6a and the motor current monitoring section 9a are supplied to a central processing unit (CPU) 11d, which will be described later, to be utilized as information for self-diagnosing the temperature of the motor 6 and the level of the supply current to the motor 6.

The control unit 11 includes a non-volatile memory, e.g. ROM 11a, a volatile memory, e.g. RAM 11b, and a writable memory, e.g. EEPROM 11c, as well as the CPU 11d.

The ROM 11a stores, in advance, various programs such as a program for executing open/close control of the door panels 1a, 1b, a program for executing a self-diagnosis which will be described later, and a communications program for implementing data communication with the administration center C.

Data to be used in executing various operations of the automatic door apparatus are temporarily stored in the RAM 11b.

The EEPROM 11c stores various operation parameters to be used in opening and closing the door panels 1a, 1b, data to be used in self-diagnosis, and so forth. The opening (closing) start speed and the opening (closing) end speed of the door panel 1a(1b) set by a service personnel are examples of the operation parameters.

Optical sensors 14a and 14b for detecting a passerby are arranged at outside and inside of the door panels 1a, 1b, respectively. Signals from the optical sensors 14a, 14b indicative of detection of a passerby are sent to the CPU 11d by way of input/output interfaces 15a, 15b, respectively.

Denoted at 16 is a regulator, e.g. a handy terminal carried by a service personnel. The handy terminal 16 is detachably connected with the CPU 11d by way of an external connecting terminal, e.g. an input/output terminal 17.

The handy terminal 16 is provided with a CPU, an ROM, an RAM, a display section, and a key input section, all of which are not shown in the drawings. When the handy terminal 16 is electrically connected with the CPU 11d, the contents stored in the EEPROM 11c are transmitted to the RAM in the handy terminal 16. Then, the contents stored in the RAM are displayed on the display section of the handy terminal 16 in response to manipulation of the user through the key input section. Also, when the user designates the rotating speed of the motor 6 through the key input section, for example, the designated rotating speed of the motor 6 is transmitted to the EEPROM 11c in the control unit 11 for storage. In this way, the parameter of the door opening/closing speed is changeable.

Reference numeral 18 denotes a personal handy-phone system (PHS) terminal of a card-type which is built in with a modem and equipped with an antenna. The PHS terminal 18 is electrically connected with the control unit 11 by way of an input/output interface 19. The personal handy-phone system is such that a radio base station (PHS cell station) covering a very small area is installed in an area where users of PHS terminals are found densely, and the PHS cell station is communicatively connected with a digital network. In the personal handy-phone system, since radio communication is digitized, good and relatively high-speed data transmission is established with high security.

It is needless to say that continuous data transmission is secured in this embodiment because the location where the inventive automatic door apparatus is installed is generally an apartment, an office, or a public facility where there is no hindrance against radio communication with the base station $BS_1$ and because there is no likelihood that the PHS terminal 18 is used as a movable object in this embodiment.

The CPU 11d reads out the contents stored in the EEPROM 11c in response to receiving a transmission request, which will be described later, and transmits the contents to the PHS terminal 18.

What is to be transmitted to the PHS terminal 18 is operating information H concerning the automatic door apparatus $A_1$. Specifically, examples of the contents on the operating information H include the door number for allowing a user to identify the door apparatus for administration (hereinafter, called as "door apparatus ID number"), the date and time when the relevant operation was recorded, the number of times of opening/closing the door, the frequency of opening/closing the door, the measured values such as the motor voltage, the value set by the service personnel (e.g. door opening speed), and a self-diagnosis result. In the case where it is judged that abnormality took place as a result of self-diagnosis, information reporting the occurrence of abnormality is sent to the administration center C instantaneously at the time when it is judged that the abnormality took place.

The self-diagnosis is executed in compliance with the self-diagnosis program stored in the ROM 11a. Specifically, the self-diagnosis includes diagnosis on the motor current, motor temperature, breakage of the belt, optical sensor, door resistance, operated states of the CPU 11d, ROM 11a, RAM 11b, and EEPROM 11c.

In the following, some of the examples of the self-diagnosis are described.

The diagnosis of the motor current is diagnosis as to whether a signal from the motor current monitoring section 9a is normal.

Specifically, while the motor 6 is normally operated, the current flowing through the motor 6 is smaller than a predetermined value. Taking this into consideration, diagnosis is performed by causing the motor current monitoring section 9a to detect the current flowing in the motor 6 while the motor 6 is rotated, and judgment is made as to whether the current is not smaller than the predetermined value. If it is judged that the detected current is not smaller than the predetermined value, the detection of such an exceedingly large current in the motor 6 means abnormality of the motor current. Then, data indicating a motor current abnormality is stored in the EEPROM 11c along with the date and time of the occurrence of the abnormality.

Likewise, if it is judged that the motor temperature detected by the motor temperature monitoring section 6a exceeds a predetermined value, data indicating a motor temperature abnormality is stored in the EEPROM 11c along with the date and time of the occurrence of the abnormality.

Also, if the signal from the encoder 12 is exceedingly larger than a count value which is supposed to be outputted from the encoder 12 in a normal opening state of the door apparatus, it is judged that the belt is broken. Then, data indicating breakage of the belt is stored in the EEPROM 11c along with the date and time of the occurrence of the abnormality. In this way, self-diagnosis is performed.

The administration center C includes, a telephone 20, a modem 21, an input/output interface 22, and an automatic door administrator 23. The automatic door administrator 23 in the administration center C is communicatively connected with the network B.

Referring to FIG. 2, the automatic door administrator 23 has an information input section 30 for receiving data from the input/output interface 22. The information received in the information input section 30 is outputted to either one of a malfunction handling section 31, an operating information collecting section 32, a searching section 33, and a malfunction predicting section 34.

An operating information accumulating section 35 stores the operating information H which is sent from the respective automatic door apparatuses $A_1$ through $A_n$, and functions as a database.

A malfunction predict data extractor 36 extracts information I necessary for predicting malfunction from the operating information H stored in the operating information accumulating section 35, and sends the extracted information I to a malfunction predict data accumulating section 37.

The information I includes product information $I_1$, installation information $I_2$, operating information history $I_3$, maintenance history $I_4$, and designated value history $I_5$.

The product information $I_1$ is information concerning specifications of products such as the malfunctioned automatic door apparatus and optional parts thereof. The installation information $I_2$ is information concerning the constructed site of the malfunctioned automatic door apparatus and the installed environment (such as the condition that the door apparatus is installed with its front portion facing the west). The operating information history $I_3$ is a history relating to the operating information of the malfunctioned automatic door apparatus (such as the door apparatus ID number, self-diagnosis result, the integrated number of times of opening and closing the door, and frequency of opening and closing the door). The maintenance history $I_4$ is a history relating to maintenance service of the malfunctioned automatic door apparatus. The designated value history $I_5$ is a history relating to various designated values with respect to the malfunctioned automatic door apparatus.

A result of search and a result of prediction regarding malfunction respectively outputted from the searching section 33 and the malfunction predicting section 34 are transmitted to the input/output interface 22 by way of an information output section 38, and transmitted to an information terminal device $d_1$ of the maintenance station $D_1$ by way of an input/output interface 42.

Next, the control operations of the automatic door administrator 23 having the above arrangement are described with reference to FIGS. 3A through 15.

<Operation of Collecting Operating Information>

Figure 3A:
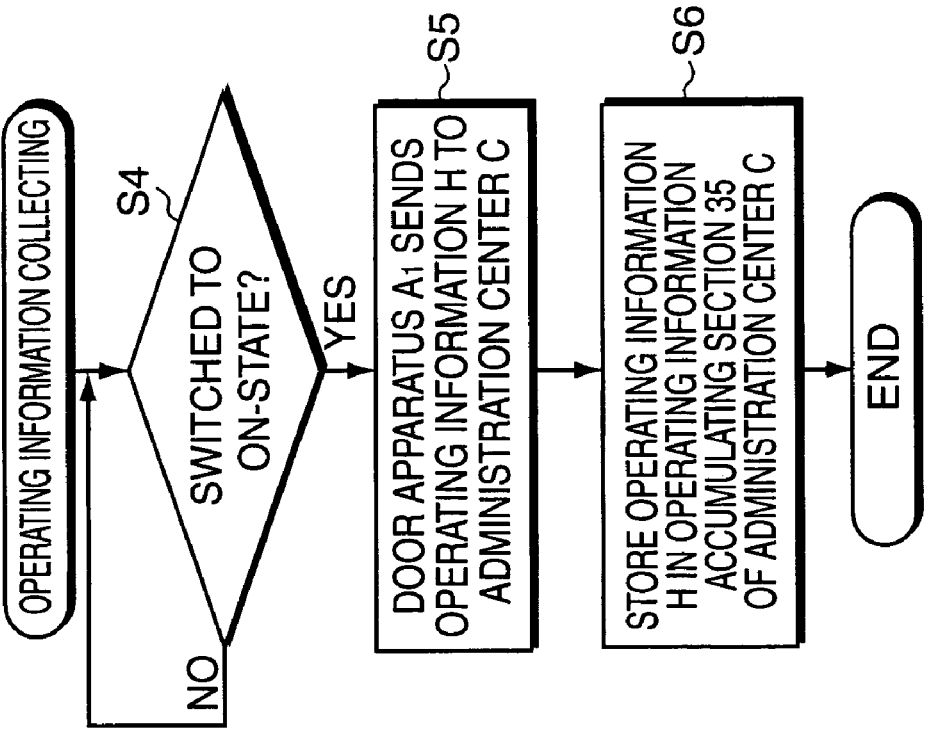

FIG. 3A is a flowchart showing an operation of collecting operating information to be applied to an automatic door apparatus installed, for example, in an apartment where power is kept in an on-state.

FIG. 3B is a flowchart showing an operation of collecting operating information to be applied to an automatic door apparatus installed, for example, in an office where the power is turned on when the office hour starts, and is turned off when the office hour ends.

Referring to FIG. 3A, after sending a polling signal to the target automatic door apparatus for which the operating information is to be collected, the operating information collecting section 32 of the administration center C requests the target door apparatus to send the current operating information thereof (Step S1).

Let it be assumed that the automatic door apparatus $A_1$ is the target door apparatus. In response to the request, the automatic door apparatus $A_1$ reads out the operating information H thereof from the EEPROM 11c, sends the operating information H to the administration center C by way of the PHS terminal 18 (Step S2).

Upon receiving the operating information H, the administration center C sends the operating information H to the operating information collecting section 32, which, in turn, checks whether the automatic door apparatus (in this case, the apparatus $A_1$) matches with one of the automatic door apparatuses in the apparatus list stored in the operating information accumulating section 35 based on the door apparatus ID number in the operating information H, and stores the operating information H in a certain area of a memory table in the operating information accumulating section 35 corresponding to the ID number of the automatic door apparatus with which the matching is verified (Step S3).

The operating information H is sequentially stored in time-series into the operating information accumulating section 35.

Referring to FIG. 3B showing an operation of collecting operating information with respect to the automatic door apparatus whose power is regularly turned on and off according to a predetermined schedule, if it is judged that power to the control unit 11 in the automatic door apparatus $A_1$ is switched from an off-state to an on-state, for example (YES in Step S4) as a result of monitoring change of power supplied to the control unit 11, the automatic door apparatus $A_1$ reads out the operating information H stored in the EEPROM 11c, and sends the operating information H to the administration center C via the PHS terminal 18 (Step S5).

Upon receiving the operating information H, the administration center C sends the operating information H to the operating information collecting section 32, which, in turn, stores the operating information H in the operating information accumulating section 35 (Step S6).

<Operation of Handling Malfunction>

When a malfunction is found as a result of self-diagnosis implemented by the automatic door apparatus $A_1$, the automatic door apparatus $A_1$ sends the operating information H stored in the EEPROM 11c to the administration center C without waiting a polling signal from the administration center C. The operating information H is stored in the operating information accumulating section 35 in the similar manner as in the operating information collecting operation shown in FIG. 3A. Since a signal indicative of occurrence of abnormality is included in the operating information H in this case, the program for activating the malfunction handling section 31 is started as follows.

When the program for activating the malfunction handling section 31 is started, a main screen showing occurrence of abnormality is popped up, as shown in FIG. 4A, on the screen of the display device of the administration center C. On the abnormality-indication main screen, there are displayed the date and time when the abnormality was detected, the door apparatus ID number indicating the automatic door apparatus in which the abnormality was detected, the contents on abnormality as a result of self-diagnosis, and specific door information concerning the automatic door apparatus. The specific door information includes the type of engine of the door apparatus, the type of sliding door such as one-way sliding or two-way sliding, and date of installation of the door apparatus.

When the user selects a tab on the abnormality-indication main screen, a further detailed information is displayable. For instance, when the user selects the tab regarding the operation history of the automatic door apparatus, the operation history is listed up in time-series, as shown in FIG. 4B.

Further, when the user selects the tab regarding the handling case, actual examples of eliminating breakage of the belt are listed up, as shown in FIG. 4C, so that a service personnel can refer to the examples in repair.

Further, although not illustrated, when the user selects the tab regarding client information, client information such as the name and address of the client, and contact information is displayed. Likewise, when the user selects the tab regarding maintenance, information regarding the maintenance service agent is displayed. Arranging a link button accessible to the client (maintenance service agent) on the screen displaying the client information (maintenance service agent information) makes it possible to immediately alert the client (maintenance service agent) to the occurrence of abnormality by merely pressing the link button when abnormality took place.

<Operation of Searching Operating Information>

The operating information H stored in the administration center C is viewable from the maintenance station $D_1$ through the Internet.

Specifically, when a user sends a request of displaying the operating information H from the information terminal device $d_1$ of the maintenance station $D_1$ to the administration center C through the Internet, the request is sent to the administration center C through the input/output interface 42, the modem 41, the telephone 40, and the Internet in this order.

Upon receiving the request, the searching section 33 in the administration center C sends a search screen image to the maintenance station $D_1$ through the information output section 38, the input/output interface 22, the modem 21, the telephone 20, and the Internet in this order so that the user can search desired information on the search screen.

In response to the request, a search main screen regarding the operating information (hereinafter, called as "operating information search main screen") as shown in FIG. 5A is displayed on the display screen of the information terminal device $d_1$.

On the operating information search main screen, there are displayed keyword entry sections such as an engine type entry section 50a, a client name entry section 50b, an area entry section 50c, a builder name entry section 50d, and an installation year entry section 50e. When a user enters one or more keywords in the sections 50a through 50e, the operating information of the relevant automatic door apparatus is retrieved from the operating information accumulating section 35, and is displayed on the display screen of the information terminal device $d_1$.

Next, when the user manipulates the information terminal device $d_1$ to move the cursor to one of the search results displayed on a search result display section 50f of the operating information search main screen and clicks thereat, the operating information search main screen is switched to a search detail screen regarding the operating information (hereinafter, called as "operating information search detail screen"), as shown in FIG. 5B.

On the operating information search detail screen, there are displayed the door apparatus ID number, the engine type, the door type, the installation date, etc.

The operating information search detail screen includes an item designation section 51a. When a user clicks on the item designation section 51a, an item which the user can desirably designate, such as door opening speed and door closing speed is listed up. For instance, when the user designates the door opening speed, the door opening speed currently set is displayed in a designated value display section 51b.

Further, when the user selects the maintenance history tab on the operating information search detail screen, information on the maintenance services that have been implemented during the designated period is shown as the maintenance history in time-series, as shown in FIG. 6A.

Specifically, when the user selects the maintenance history tab on the operating information search detail screen, and enters certain dates in a maintenance start date section 52a and a maintenance end date section 52b, respectively, the maintenance history from the designated start date to the designated end date (namely, the search period) is listed up in time-series, as shown in FIG. 6A.

Furthermore, when the user selects the operation history tab on the operating information search detail screen, and enters certain dates in an operation start date section 53a and an operation end date section 53b, respectively, the operation history from the designated start date to the designated end date (namely, the search period) is listed up in time-series, as shown in FIG. 6B.

<Operation of Predicting Malfunction>

Figure 7:
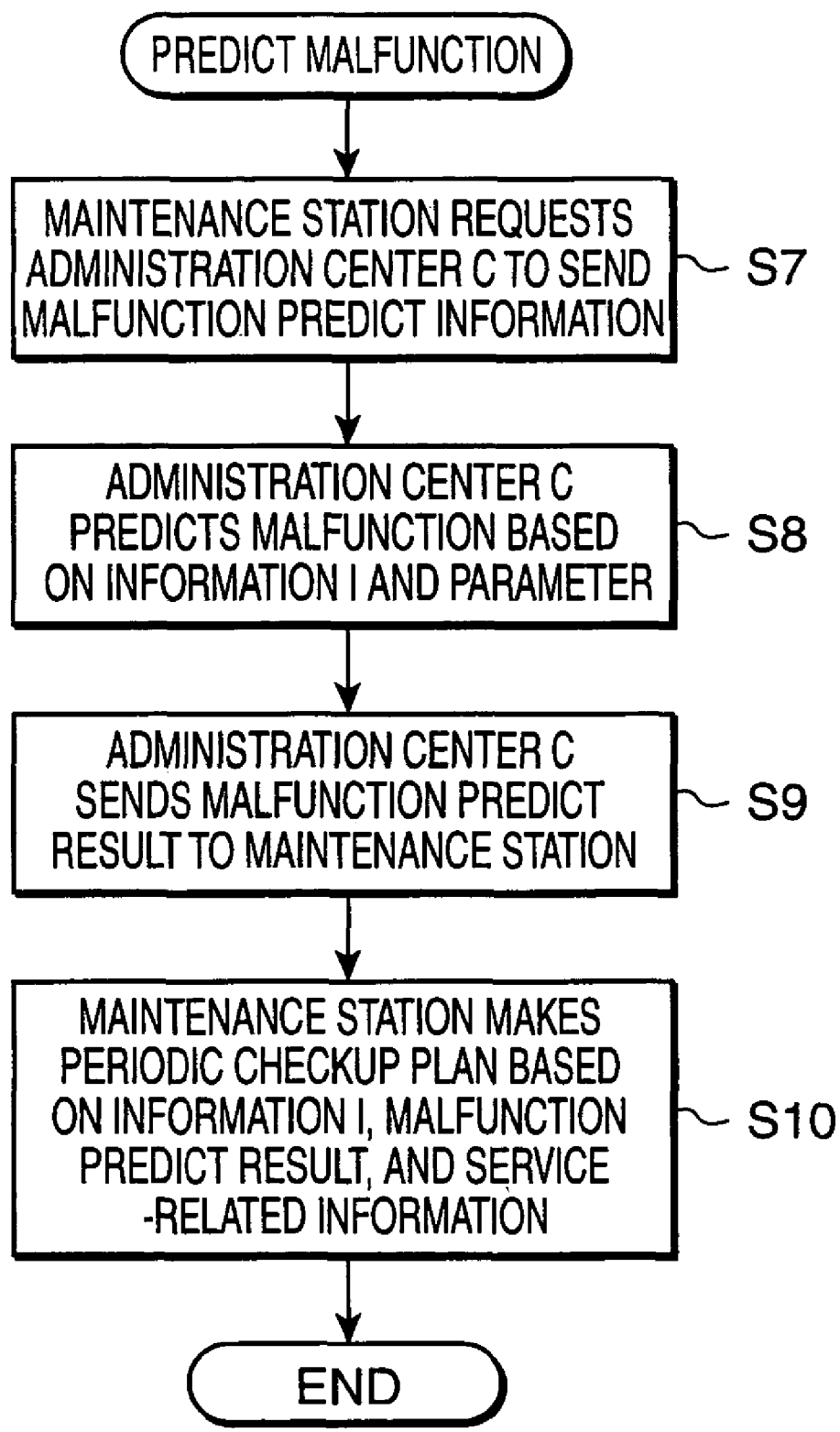
FIG. 7 is a flowchart showing a malfunction predict operation.

Referring to FIG. 7, the operation of predicting malfunction is described.

When malfunction predict is requested from the information terminal device $d_2$ of the maintenance station $D_2$ to the administration center C, for example, the request is transmitted from the maintenance station $D_2$ to the administration center C through the input/output interface 42, the modem 41, the telephone 40, and the Internet, and the operation of predicting malfunction is started, as shown in FIG. 7 (Step S7).

Upon receiving the request of predicting malfunction, the administration center C causes the display screen of the information terminal device $d_2$ of the maintenance station $D_2$ to display a search main screen regarding the malfunction predict (hereinafter, called as "malfunction predict search main screen"), as shown in FIG. 8A.

On the malfunction predict search main screen, there are displayed keyword entry sections such as an engine type entry section 60a, an emergency level entry section 60b, an installation area entry section 60c, and a search period entry section 60d. When a user enters one or more keywords in the sections 60a through 60d, and clicks on a search start button 60e, a search result is listed up in a display section 60f provided in a lower part of the screen.

When a user enters "maximum" in the emergency level entry section 60b, all the emergency levels from a serious malfunction such as belt breakage to an insignificant disorder such as generation of noise are retrieved. In the example shown in FIG. 8A, "maximum" is designated as the emergency level. It should be appreciated that when a certain date is designated as the search start date, the date four months ahead of the designated search start date is automatically designated as the search end date.

When the user selects one of the search results that have been retrieved under the designated conditions, a search detail screen regarding the malfunction predict (hereinafter, called as "malfunction predict search detail screen") is displayed, as shown in FIG. 8B.

On the malfunction predict search detail screen, there are displayed information such as the door apparatus ID number, the engine type, the door type, and the installation date.

When a user clicks on the operation history tab on the malfunction predict search detail screen, an operation history is displayed, as shown in FIG. 9A. Likewise, when the user clicks on the maintenance history tab, a maintenance history is displayed, as shown in FIG. 9B.

Furthermore, when the user clicks on the predict content tab, the malfunction predicting section 34 of the administration center C provides malfunction predict based on information I stored in the malfunction predict data accumulating section 37 (Step S8).

Specifically, the malfunction predicting section 34 classifies the information I stored in the malfunction predict data accumulating section 37 according to the following parameters.

i) the number of opening/closing the door;
ii) designated value;
iii) self-diagnosis result; and
iv) maintenance contents Furthermore, the malfunction predicting section 34 subclassifies the number of opening/closing the door into a plurality of levels of times such as 1 to 1,000 times, 1,001 to 2,000 times, 2,001 to 3,000 times, . . . , for example, and lists up the malfunctions that have taken place in the past in each level of times.

If the cause of the malfunction is abrasion of a door gear, for example, the malfunction predicting section 34 checks up the integrated number of times of opening/closing the target automatic door apparatus up to the date when the malfunction predict was requested, and displays the probability of occurrence of malfunction due to abrasion of a door gear in terms of percentage, which is obtained by dividing the number t of times of malfunctions of the door gear in the level of times containing the sum of the integrated number of times plus a possible integrated number of times of opening/closing the door in one week ahead of the requested date, by the sample number n of the parent population stored in the malfunction predict data accumulating section 37. The integrated number of times of opening/closing the target automatic door apparatus up to the requested date is included in the operating information H. It should be appreciated that the sample number n of the parent population is derived from the same type of the door apparatus as the target door apparatus. The above calculation is conducted with respect to periods covering one month, three-months, and six-months ahead of the requested date, and the calculation results are shown in terms of percentage.

Thus, the maintenance station $D_2$ can evaluate the emergency level before a service personnel actually performs maintenance service.

The results of malfunction predict are displayed as shown in FIG. 9C, for example. Referring to FIG. 9C, the first item in the contents on predict is "probability of generation of noise due to door gear abrasion", and the probability of generation of noise due to door gear abrasion is 20% within one week, 30% within one month, 60% within three months, and 100% within six months from the predicted date (requested date). The second item in the contents on predict is "probability of generation of noise due to rail abrasion", and the probability of generation of noise due to rail abrasion is 5% within one week, 20% within one month, 40% within three months, and 60% within six months from the predicted date (requested date).

The results of malfunction predict are sent to the maintenance station $D_2$ along with the information I (Step S9).

Upon receiving the results of malfunction predict and the information I, the maintenance station $D_2$ is allowed to make a maintenance plan, considering the malfunction predict results and the information I, and the service-related information stored in the information terminal device $d_2$, if necessary (Step S10).

Next, another embodiment of this invention is described with reference to FIGS. 10 to 15. FIG. 10 is a diagram showing an arrangement of an automatic door apparatus $A_1'$ equipped with a malfunction monitoring function, in place of the automatic door apparatus $A_1$ in the first embodiment shown in FIG. 1.

Elements in FIG. 10 identical to those in FIG. 1 are denoted at the same reference numerals, and description thereof is omitted herein.

The automatic door apparatus $A_1'$ shown in FIG. 10 is communicatively connected with an administration center C via a network B, a router R, and an interface IF. The administration center C is further communicatively connected with an information terminal device $d_1$ of a maintenance station by the Internet or a public telephone line. It should be appreciated that plural automatic door apparatuses $A_1'$ through $A_n'$ may be provided in place of the single automatic door apparatus $A_1'$, and plural information terminal devices $d_1$ through $d_n$ of plural maintenance stations may be provided in place of the single information terminal device $d_1$.

The automatic door apparatus $A_1'$ has a CPU 70. The CPU 70 is electrically connected with an ROM 71 which stores programs of executing control of opening/closing door panels 1a, 1b of the door apparatus, self-diagnosis, etc., an RAM 72 which stores operating information and other data of the automatic door apparatus which is changed every second or every minute, and an EEPROM 73 which stores designated information such as operation parameters to be used in control of opening/closing the door panels 1a, 1b, and data to be used in self-diagnosis in an optionally writable manner.

The CPU 70 is further electrically connected with a first activation sensor 74 arranged on the interior of the building for detecting a passerby approaching toward the door panels and for outputting an activation signal indicative of detection of the passerby, a second activation sensor 75 arranged on the exterior of the building for detecting a passerby leaving the door panels and for outputting an activation signal indicative of detection of the passerby, and a sub sensor 76 for detecting a passerby passing through the doorway and for outputting a signal indicative of detection of the passerby. The CPU 70 is further electrically connected with an electrical lock (external device) 77 which electrically locks the door panels 1a, 1b in the nighttime, and other device.

The CPU 70, ROM 71, RAM 72, EEPROM 73, as well as a motor drive unit 9 constitute an automatic door controller (controller) 78.

The automatic door controller 78 is electrically connected with an automatic door monitoring device 80, which will be described later, via an interface 79.

In the following, the arrangement of the automatic door monitoring device 80 is described.

The automatic door monitoring device 80 is electrically connected with a power source via a power line 82, which is different from a power line for supplying power to the automatic door controller 78.

The automatic door monitoring device 80 includes a CPU 83, an ROM 84, an RAM 85, and an EEPROM 86. The ROM 84 stores a program for monitoring the automatic door apparatus, which is read out by the CPU 83 for reference. The RAM 85 stores the operating information and information regarding self-diagnosis both of which are derived from the automatic door controller 78. The EEPROM 86 stores the contents stored in the EEPROM 73 of the automatic door controller 78 as backup data. The RAM 85 and the EEPROM 86 serves as a memory device.

An external abnormality sensor 87 is electrically connected with the input side of the CPU 83 for detecting malfunction which is un-detectable by the self-diagnosing function of the conventional automatic door controller. The external abnormality sensor 87 serves as an extractor. For instance, the external abnormality sensor 87 can check whether the door panel is dirty or not by detecting the light amount reflected from the surface of the door rail, detect the internal temperature of a door open/close mechanism, or detect vibration of the door apparatus.

A power detecting section 88 is provided to check whether power is supplied to the automatic door controller 78 by monitoring a main switch 89 electrically connected with the automatic door controller 78. Specifically, in the case where the door panel is not activated despite power supply, it is judged that the CPU 70 is out of order. Thus, it is judged that the CPU 70 is out of order even if self-diagnosis by the automatic door controller 78 fails to function due to disorder of the CPU 70.

An external apparatus 90 such as an alert lamp and a display unit is electrically connected with the output side of the CPU 83 to alert people around the automatic door apparatus of the malfunction of the door apparatus.

An input-side interface 91 is electrically connected with an interface 79 of the automatic door controller 78, and an output-side interface 92 is electrically connected with a communications device 93.

The communications device 93 includes a card-type PHS terminal built in with a modem and equipped with an antenna, for example.

Next, a control operation of the automatic door monitoring device 80 having the above arrangement is described with reference to FIGS. 11 through 15.

First, the CPU 83 in the automatic door monitoring device 80 requests the CPU 70 in the automatic door controller 78 to send the operating information of the target door apparatus every 0.1 second, for example (Step S11).

In response to the request, the CPU 70 reads out the operating information stored in the RAM 72, and sends the operating information to the automatic door monitoring device 80 (Step S12).

The operating information which is read out from the RAM 72 and is sent to the automatic door monitoring device 80 is information corresponding to one row in an operating information log table (hereinafter, simply called as "log table"), as shown in Table 1.

The CPU 83 generates a log table as shown in Table 1 by sequentially storing the operating information row by row in the RAM 85.

TABLE 1

| | state of input flag | | | state of output flag | | | |
|---|---|---|---|---|---|---|---|
| C1 | C2 | C3 | C4 | C5 | C6 | C7 | C8 |
| −77 | Off | Off | Off | lock | 0 | full close | — |
| −76 | Off | Off | Off | lock | 0 | full close | — |
| −75 | On | Off | Off | lock | 0 | full close | — |
| −74 | On | Off | Off | unlock | 0 | accel open | — |
| −73 | On | Off | Off | unlock | 10 | accel open | — |
| −72 | On | Off | Off | unlock | 30 | accel open | — |
| −71 | On | Off | Off | unlock | 40 | accel open | — |
| −70 | Off | Off | On | unlock | 45 | const open | — |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| −34 | Off | On | On | unlock | 80 | const open | — |
| −33 | Off | On | On | unlock | 85 | decel open | — |
| −32 | Off | On | Off | unlock | 87 | decel open | — |
| −31 | Off | On | Off | unlock | 90 | decel open | — |
| −30 | Off | On | Off | unlock | 91 | cush open | — |
| −29 | Off | Off | Off | unlock | 91 | cush open | — |
| −28 | Off | Off | Off | unlock | 92 | full open | — |
| −27 | Off | Off | Off | unlock | 92 | full open | — |
| −26 | Off | Off | Off | unlock | 92 | full open | — |
| −25 | Off | Off | Off | unlock | 92 | full open | — |
| −24 | Off | Off | Off | unlock | 85 | accel close | — |
| −23 | Off | Off | Off | unlock | 72 | accel close | — |
| −22 | Off | Off | Off | unlock | 68 | accel close | — |
| −21 | Off | Off | Off | unlock | 75 | inverse | — |
| −20 | Off | Off | Off | unlock | 85 | inverse | — |
| −19 | Off | Off | Off | unlock | 92 | inverse | — |
| −18 | Off | Off | Off | unlock | 92 | full open | — |
| −17 | Off | Off | Off | unlock | 85 | accel close | — |
| −16 | Off | Off | Off | unlock | 72 | accel close | — |
| −15 | Off | Off | Off | unlock | 68 | accel close | — |
| −14 | Off | Off | Off | unlock | 75 | inverse | — |
| −13 | Off | Off | Off | unlock | 85 | inverse | — |
| −12 | Off | Off | Off | unlock | 92 | inverse | — |
| −11 | Off | Off | Off | unlock | 92 | full open | — |
| −10 | Off | Off | Off | unlock | 85 | accel close | — |
| −9 | Off | Off | Off | unlock | 72 | accel close | — |
| −8 | Off | Off | Off | unlock | 68 | accel close | — |
| −7 | Off | Off | Off | unlock | 75 | inverse | — |
| −6 | Off | Off | Off | unlock | 85 | inverse | — |
| −5 | Off | Off | Off | unlock | 92 | inverse | — |
| −4 | Off | Off | Off | unlock | 92 | full open | — |
| −3 | Off | Off | Off | unlock | 85 | accel close | — |
| −2 | Off | Off | Off | unlock | 72 | accel close | — |
| −1 | Off | Off | Off | unlock | 68 | accel close | — |
| 0 | Off | Off | Off | unlock | 68 | accel close | abnormal |

Note:
0 denotes full—close position
100 denotes full—open position

Time indexes having the number from 0 to −77 (hereinafter, called as "index") are registered in time-series in the column C1 of the log table. It should be appreciated that 0 indicates the current time, and the symbol-indicates past time from the current time behind a certain duration. The more the number is incremented, the more the time is behind from the current time. The operating information sent from the CPU 70 is classified into a certain number of columns in the row of the relevant index number, and stored in the RAM 85 in time-series.

The operating information to be sent to the automatic door monitoring device 80 includes on/off state of the first activation sensor 74 (see column C2), on/off state of the second activation sensor 75 (see column C3), on/off state of the sub sensor 76 (see column C4), all of which are primarily detected as a judgment as to whether an input flag is set to "Off" or "On", locked/unlocked state of the electric lock 77, which is detected as a judgment as to whether an output flag is set to "Off" or "On" (see column C5), position of the door panel relative to the initial position (see column C6), open/close control state of the door panel (see column C7), and self-diagnosis result (see column C8).

Each information indicating the state of the input flag is regarded as sensor state information indicating a detected state of the sensor 74 (or 75 or 76). The information indicating the state of the output flag, the door position information, and the information regarding the open/close control state of the door panel are regarded as door state information indicating the status of the door panel.

If it is judged that the self-diagnosis result in the operating information to be sent to the automatic door monitoring device 80 does not include a signal indicative of occurrence of malfunction (NO in Step S13), the operating information is stored in the RAM 85 (Step S14), and the routine returns to Step S11. As long as the self-diagnosis result does not include a signal indicative of occurrence of malfunction, the operations from Step S11 through S14 are cyclically repeated every 0.1 second.

On the other hand, if it is judged that the self-diagnosis result includes a signal indicative of occurrence of malfunction (YES in Step S13), it is judged whether the malfunction occurred for the first time (Step S15). If the judgment result is affirmative (YES in Step S15), the CPU 83 requests the CPU 70 to send the operation history up to the current time or requested time (Step S16). Note that the CPU 70 is generally designed to send the self-diagnosis result successively every predetermined time once malfunction took place unless otherwise specifically requested. Accordingly, in this embodiment, the CPU 83 is designed to request the CPU 70 to send the operation history based on a determination that the malfunction took place for the first time. If it is judged that the occurrence of malfunction is not the first time occurrence (NO in Step S15), the routine returns to Step S11 while rendering the second and subsequent occurrence of malfunction invalid, whereby the CPU 83 requests the CPU 70 to send the operating information of the target door apparatus at a predetermined cycle.

Referring back to Step S16, in response to the request of sending the operation history, the CPU 70 reads out the operation history up to the current time from the EEPROM 73, and sends the operation history to the CPU 83 (Step S17).

The CPU 83 stores the operation history in the EEPROM 86 as backup data (Step S18). As shown in FIG. 12, the operation history includes, for example, information regarding the number of times of safety returns indicating the number of times of collisions of the door panel against a passerby (or an object) which is detected as repeated opening/closing operations of the door panels, information regarding the number of times of activations of the temperature sensor indicating the number of times of detections of overheat abnormality of a motor 6, information regarding the number of times of checkups indicating how many times maintenance service has been conducted, information regarding the number of times of opening/closing the door panels, and information regarding the number of times of resetting the CPU 70. In the case where the EEPROM 86 already stores the operation history as backup data in Step S18, a newest operation history is overwritten and stored in the EEPROM 86.

Subsequently, the CPU 83 alerts the administration center C to the malfunction of the automatic door apparatus via the communications device 93 (Step S19).

The designated information stored in the EEPROM 73 of the automatic door controller 78 includes, as shown in FIG. 13, speed of opening the door panel, speed of closing the door panel, open timer indicating the duration of retaining an on-signal of the sensors 74, 75, 76, start torque, brake torque, inversion torque indicating brake torque at the time of backward rotation of the motor 6, cushion opening speed indicating reduced speed before the door panel reaches its full-open position, cushion closing speed indicating reduced speed before the door panel reaches its full-close position, full-open stroke, and half-open stroke.

The designated information is desirably changeable by a service personnel by electrically connecting the connector of the handy terminal 16 with the interface 17. The designated information is sent to the EEPROM 86 of the automatic door monitoring device 80 each time the designated information is changed, in addition to the above-mentioned cyclical data transmission every 0.1 second.

Figure 14:
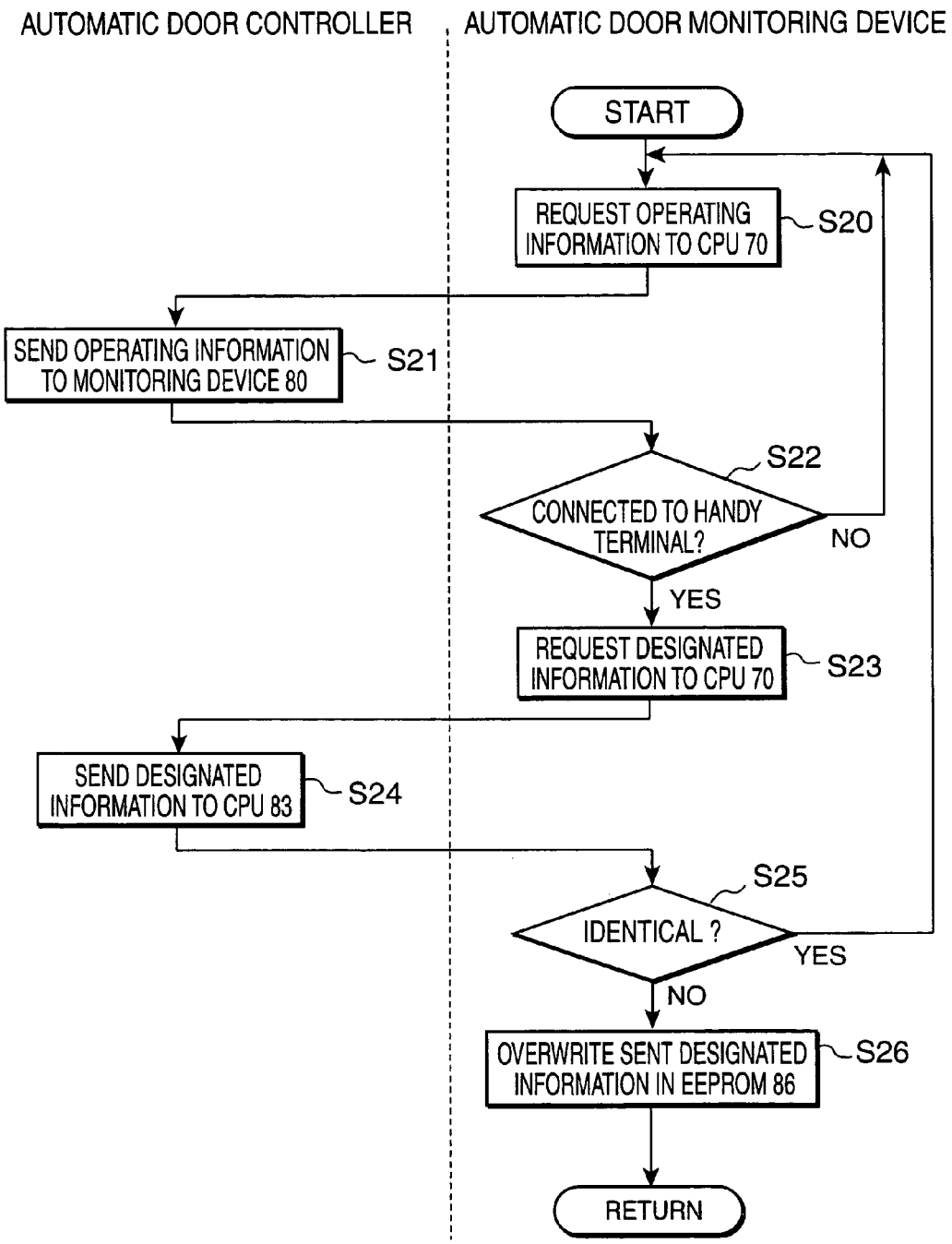
FIG. 14 is a flowchart showing a control operation of the automatic door monitoring device in FIG. 10.

FIG. 14 is a flowchart showing a control operation as to how the designated information is sent.

First, the CPU 83 in the automatic door monitoring device 80 requests the CPU 70 in the automatic door controller 78 to periodically send the operating information of the relevant door apparatus (Step S20).

In response to the request, the CPU 70 reads out the operating information stored in the RAM 73, and sends the operating information to the automatic door monitoring device 80 (Step S21).

The CPU 83 sequentially stores the operating information in the RAM 85. If it is judged that the operating information includes information indicating connection to the handy terminal 16 (YES in Step S22), the CPU 83 requests the CPU 70 to send the designated information stored in the EEPROM 73 (Step S23).

In response to the request, the CPU 70 reads out the designated information stored in the EEPROM 73, and sends the designated information to the CPU 83 (Step S24).

Upon receiving the designated information, the CPU 83 compares the designated information sent from the EEPROM 73 with the designated information currently stored in the EEPROM 86 (Step S25). If it is judged that the information are not identical to each other (NO in Step S25), the designated information sent from the EEPROM 73 is overwritten in the EEPROM 86 for storage (Step S26).

In this way, in the automatic door monitoring device 80, the operating information for a certain duration behind the current time is securely stored in the RAM 85, and the designated information updated by the service personnel is stored in the EEPROM 86.

In other words, when malfunction took place in the automatic door apparatus, the on/off state (signal output state) of the sensors 74, 75, 76 for the duration from the monitoring start time to the time when the malfunction took place, the open/close control state of the door panels that have been operated based on the detection results of the sensors 74, 75, 76, the operated state (locked or unlocked state) of the electric lock 77 are recorded in time-series along with the self-diagnosis result. With this arrangement, a service personnel can grasp the background regarding the cause of the malfunction, as well as determining the malfunctioned part of the door apparatus.

Next, described is a procedure as to how the cause of the malfunction is analyzed according to the log table shown in Table 1.

First, when a passerby approaches the door panels 1a, 1b, the flag of the first activation sensor 74 is changed from "Off" to "On" (see C2 at the index number −75), and kept in the "On" state for a certain duration (see C2 at the index numbers −75 through −71), and the flag of the electric lock 77 is changed from "Lock" to "Unlock" (see C5 at the index number −74).

When the electric lock 77 is unlocked, the automatic door controller 78 controls the motor drive unit 9 to accelerate the opening speed of the door panels 1a, 1b.

During passage of the passerby through the doorway, the flag of the sub sensor 76 is changed from "Off" to "On" (see C4 at the index number −71), and kept in the "On" state (see C4 at the index numbers −71 though −33). When the passerby is about to leave the door panels, the flag of the second activation sensor 75 is changed from "Off" to "On" (see C3 at the index number −34).

Observing the open/close control state of the door panel (see column C7), the state is changed from "accelerated opening speed" ("accel open"in C7) →"constant opening speed" ("constant open" in C7)→"decelerated opening speed" ("decel open" in C7)→"cushion opening speed" ("cush open" in C7) "full-open" in this order (see C7 at the index numbers −74 through −25).

Next, when the passerby is away from the door panels through the doorway, the flag of the second activation flag 75 is changed from "On" to "Off" (see C3 at the index number −29), and the CPU 70 controls the motor drive unit 9 to close the door panels 1a, 1b at "accelerated closing speed" ("accel close" in C7 at the index number −24).

If the door apparatus is operated normally, the control state of the door panels 1a, 1b is shifted from "accelerated closing speed"→"constant closing speed"→"decelerated closing speed"→"cushion closing speed"→"full-close" in this order.

The log table, however, records, after "accelerated closing speed" (see "accel close" in C7 at the index number −24), a combination pattern of "inverse operation" ("inverse" in C7)→"full-open" representing an opening operation (see C7 at the index numbers −21 through −18), and "accelerated closing speed" ("accel close" in C7) representing a closing operation (see C7 at the index numbers −17 through −15) in a repeated manner. While this operation pattern is repeatedly recorded, the flag of each sensor (first activation sensor 74, the second activation sensor 75, and the sub sensor 76) is in an "Off" state.

At the final index number 0, overheat abnormality of the motor 6 ("abnormality" in C8) is reported as a self-diagnosis result. In this embodiment, overheat abnormality of the motor 6 is alerted if the temperature detected by the temperature sensor 6a for monitoring the surface temperature of the motor 6 exceeds a predetermined value.

In this way, analysis on the operating information recorded in the log table leads to an estimation that the self-diagnosis report of overheat abnormality of the motor 6 is not issued resulting from malfunction of the motor itself but is issued resulting from repeated opening/closing operations of the door panels attributable to trapping of a foreign matter undetectable by the sensor 74 (or 75, or 76) in the guide rails of the door panels, or the like.

There are presumed two kinds of causes for overheat abnormality of the motor 6, namely, malfunction of the motor itself, and excessive load exerted to the motor 6. In view of this, some of the rows in the column C7 may be highlighted by inverse display or change of the color so that a service personnel can easily check whether the opening/closing operation of the door panels, which may be a cause of excessive load to the motor 6, is executed normally.

In this embodiment, the RAM 85 in the automatic door monitoring device 80 stores a command signal which is outputted from the CPU 70 to the electric lock 77 to lock or unlock the electric lock 77, and an input signal indicative of the position of the door which is sent from the encoder 12 to the CPU 70. With this arrangement, a service personnel is notified that the electric lock 77 is not normally operated (namely, fails to unlock) if the door position information is "0" indicating that the door is in a full-close state, irrespective of the fact that a command signal of unlocking the electric lock 77 is outputted after the first activation sensor 74 is turned "On" and that the information regarding the open/close control state of the door panels indicates "accelerated opening speed".

In other words, the cause of the above malfunction is properly estimated as operation failure of the electric lock 77 irrespective of the self-diagnosis result reporting that the cause of abnormality signal issuance is overheat abnormality of the motor 6 (namely, the malfunctioned part is the motor 6) or breakage of the belt.

In the above arrangement, since the RAM 85 stores the door position information which is outputted from the encoder 12, judgment as to whether the open/close control of the door panels is normal can be properly made (namely, the start position of accelerating or decelerating opening/closing of the door panels, and the cushion open/close start position can be properly checked) by checking the door position information and the information regarding open/close control state of the door panels, which should be cooperatively associated with each other.

Considering the above, in the case where the opening/closing speed of the door panels is slower than the normal opening/closing speed (namely, the variation of the signal indicative of the current position of the door is retarded from the normal state) under detection of overheat abnormality of the motor 6, the service personnel can properly estimate that the door may be deformed or a foreign matter such as trash may be stuck in the guide rails.

The operating information and the designated information respectively stored in the RAM 85 and the EEPROM 87 of the automatic door monitoring device 80 are transmittable from the communications device 93 to the administration center C with the door apparatus ID number attached thereto. The log table is displayable on the display screen of a host computer installed in the administration center C.

Since the administration center C is communicatively connected with the information terminal device $d_1$ of the maintenance station via the Internet, the service personnel can browse the log table of the target automatic door apparatus under his or her control at the maintenance station by accessing the administration center C from the maintenance station and by entering the target door apparatus ID number.

Since the CPU 83 in the automatic door device 80 monitors malfunction independently of the CPU 70 in the automatic door controller 78, the CPU 83 can judge disorder of the CPU 70 in the automatic door controller 78.

Specifically, as mentioned above, the CPU 83 checks whether power is being supplied to the automatic door controller 78 by monitoring the main switch 89, and judges that the CPU 70 is out of order if the door apparatus is not normally operated despite the power supply. Thus, the CPU 83 can properly judge disorder of the CPU 70 if the CPU 70 itself is out of order.

To summarize this invention, this invention is directed to a) a method for administering automatic door apparatuses, b) a system for administering automatic door apparatuses, and c) an automatic door apparatus applicable to the administering method and the administering system.

An administering method of the invention comprises the steps of allowing each of the door apparatuses installed at different sites to send operating information of its own to an administration center with apparatus identification information attached thereto; classifying the operating information of each door apparatus in accordance with the apparatus identification information; and storing the classified operating information for output of the stored operating information depending on a calling condition.

According to the above administering method, the operating information relating to the automatic door apparatuses installed at different sites are collected to compile a database. Accordingly, the histories on the operating information and maintenance service are centrally administered, and users can share these information among a plurality of maintenance stations. Thereby, efficiency on maintenance service and repair can be improved. This arrangement is also advantageous for manufacturers of the automatic door apparatuses because materials for improvement of the automatic door apparatuses are provided.

Alternatively, the operating information may include a result on self-diagnosis. Thereby, a user is alerted to malfunction, or a possible malfunction is predicted.

Further alternatively, a user may be accessible to the administration center by communicatively connecting the administration center with an information terminal device of a maintenance station which is assigned for the user to carry out maintenance service of the door apparatus. In such an altered arrangement, part or all of the stored operating information is transmittable to the maintenance station in response to a user's request of reading out the operating information.

An administering system of the invention comprises a number of automatic door apparatuses each having a communications function, and an administration center communicatively connected with the respective automatic door apparatuses by a communication medium, wherein each of the automatic door apparatuses includes a sender which sends operating information of its own to the administration center with apparatus identification information attached thereto, and the administration center is operative to classify the operating information of each door apparatus in accordance with the apparatus identification information, and stores the classified operating information for output of the stored operating information in response to a calling. In this arrangement, the more the operating information is accumulated, the more accurate information is provided for maintenance service and repair.

The administration center may be operative to predict a possible malfunction in the requested door apparatus based on the stored operating information, and to output a result on prediction of the possible malfunction.

Alternatively, the administration center may be communicatively connected with an information terminal device of a maintenance station which is assigned for the user to carry out maintenance service of the door apparatus, and the administration center may be operative to send the information relating to occurrence of the abnormality and the self-diagnosis result attached thereto to the information terminal device of the maintenance station which is designated in advance based on the apparatus identification information in response to receiving the information relating to occurrence of the abnormality and the self-diagnosis result from the door apparatus. In such an altered arrangement, the user can determine the cause of the malfunction at the maintenance service before actually going to the site where the updated door apparatus is installed for repair.

Further alternatively, the information terminal device of the maintenance station may be operative to visibly alert occurrence of the abnormality on a display section of the information terminal device along with contents on the abnormality in response to receiving the information relating to occurrence of the abnormality and the self-diagnosis result. Thereby, the user can promptly eliminate the malfunction. Also, at least one of client contact information and maintenance service agent contact information may be displayed in terms of link or guidance on the display section. Thereby, the client can promptly and easily request the maintenance service agent of maintenance service or repair to eliminate the malfunction, or the maintenance service agent can be promptly and easily informed of the request.

Alternatively, a history on repair that has been carried out in response to the contents on the abnormality may be displayed on the display section. Thereby, the user can refer to the repair history in eliminating malfunction.

According to the automatic door apparatus having a malfunction monitoring function, a sensor state information indicating a detected state of the sensor and a door state information indicating an open/close control state of the door are extracted from the controller, as operating information of the door. The door state information is cooperatively associated with the sensor state information. Further, the extracted operating information is sequentially stored in the memory device in time-series. In this arrangement, if malfunction took place, the cause of the malfunction can be traced back properly, and maintenance service can be efficiently and accurately carried out.

In the automatic door apparatus, the operating information may include signal information which is communicable between the controller and an external apparatus electrically connectable with the controller. With such an altered arrangement, the signal information sent to the external apparatus can also be traced back along with the other operating information if malfunction took place, which contributes to easy determination of the cause of the malfunction.

Alternatively, a result on self-diagnosis obtained by the self-diagnosing function of the door apparatus may be extracted and stored in the memory device in time-series. With such an altered arrangement, since the self-diagnosis result can be checked up as well as the operating information, the cause of the malfunction can be further accurately determined.

Alternatively, an operation history of the door apparatus may be extracted from the controller, and stored in the memory device. Thereby, the user is notified of the number of times of opening/closing the door, the number of times of carrying out maintenance service, etc. This arrangement contributes to easy determination of the cause of the malfunction.

Further alternatively, the extractor may be operative to extract an altered designated value when the designated value set in the door apparatus is altered, and to store the altered designated value in the memory device. In such an altered arrangement, the user can check whether the designated information is properly set at the time when malfunction took place, e.g., door opening/closing speed is faster than the normal speed, which contributes to determination of the cause of the malfunction.

The extractor may be operative to update contents stored in the memory device at a predetermined cycle. Thereby, the user is notified of useful information immediately before malfunction takes place with reduced storage capacity of the memory device.

The extractor may suspend overwriting of the operating information into the memory device when occurrence of malfunction is detected in the door apparatus, and may retain the operating information before the detection of the occurrence of the malfunction in the memory device. In such an altered arrangement, necessary information for determination of the cause of the malfunction is retained by prohibiting overwriting of the operating information after the detection of the occurrence of the malfunction.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for administering a number of automatic door apparatuses installed at different sites, comprising the steps of:
    allowing a number of automatic door apparatuses to send their respective opening information to an administration center with apparatus identification information attached thereto, the operating information including a result on self-diagnosis of the automatic door apparatus regarding abnormality thereof;
    classifying the respective operating information in accordance with the apparatus identification information;
    storing classified operating information;
    outputting the stored operating information of a required condition;
    predicting a possible malfunction of the automatic door apparatus based on the stored operating information; and
    outputting a result of prediction regarding the possible malfunction.

2. The method according to claim 1, wherein the administration center is communicatively connected with an information terminal device provided in a maintenance station which is assigned to carry out maintenance service of the automatic door apparatus, and wherein part or all of the stored operating information is transmittable to the maintenance station in response to a request of reading out the operating information from the information terminal device.

3. A system for administering a number of automatic door apparatuses, comprising:
    a sender which is provided on each of a number of door apparatus to send operating information of its own apparatus with identification information attached thereto; and
    an administration center which receives the sent operating information and the identification information of each automatic door apparatus, and classifies the operating information in accordance with the apparatus identification information, and stores the classified operating information for output of the stored operating information in response to a request;
    wherein the administration center is operative to predict a possible malfunction in the requested door apparatus based on the stored operating information, and the administration center includes a malfunction predicting section for outputting a result of prediction regarding the possible malfunction.

4. The system according to claim 3, wherein the administration center includes a search section for making a search relating to the stored operating information under a designated condition.

5. The system according to claim 3, wherein the automatic door apparatus includes a device for self-diagnosing abnormality of the automatic door apparatus, and the sender is operative to send, to the administration center, a result of the self-diagnosis with information relating to occurrence of the abnormality attached thereto when the result of the self-diagnosis includes the information relating to occurrence of the abnormality.

6. The system according to claim 5, further comprising maintenance stations, each of which includes an information terminal device communicatively connected with the administration center, each of the maintenance stations being adapted to carry out maintenance service for at least one of the automatic door apparatuses, and the administration center being operative to receive from the automatic door apparatuses and send to a designated one of maintenance stations the information relating to occurrence of the abnormality and the self-diagnosis result attached thereto, the designated maintenance station being designated in advance based on the apparatus identification information for the automatic door apparatus that sends the administration center information relating to occurrence of the abnormality and the self-diagnosis result attached thereto.

7. A system for administering a number of automatic door apparatuses, comprising:
    a sender which is provided on each of the number of door apparatuses to send operating information of its own apparatus with identification information attached thereto; and
    an administration center which receives the sent operating information and the identification information of each automatic door apparatus, and classifies the operating information in accordance with the apparatus identification information, and stores the classified operating information for output of the stored operating information in response to a request;
    the automatic door apparatus including a device for self-diagnosing abnormality of the automatic door apparatus, and the sender being operative to send, to the administration center, a result on the self-diagnosis with information relating to occurrence of the abnormality attached thereto when the result on the self-diagnosis includes the information relating to occurrence of the abnormality, the administration center being communicatively connected with an information terminal device of a maintenance station which is assigned to carry out maintenance service of the automatic door apparatus, and the administration center being operative to send the information relating to occurrence of the abnormality and the self-diagnosis result attached thereto to the information terminal device of the maintenance station which is designated in advance based on the apparatus identification information for the automatic door apparatus that sends the administration center the information relating to occurrence of the abnormality and the self-diagnosis result attached thereto; and
    wherein the information terminal device of the maintenance station is operative to visibly alert occurrence of the abnormality on a display section of the information terminal device along with contents of the abnormality when the maintenance station receives the information relating to occurrence of the abnormality and the self-diagnosis result.

8. The system according to claim 7, wherein at least one of client contact information and maintenance station contact information is displayed in terms of link or guidance on the display section.

9. The system according to claim 7, wherein a history of repairs that have been carried out against abnormalities is visibly displayed on the display section.

10. A system according for administering a number of automatic door apparatuses, comprising:
a sender which is provided on each of the number of door apparatuses to send operating information of its own apparatus with identification information attached thereto; and
an administration center which receives the sent operating information and the identification information of each automatic door apparatuses, and classifies the operating information in accordance with the apparatus identification information, and stores the classified operating information for output of the stored operating information in response to a request;
the automatic door apparatus including a device for self-diagnosing abnormality of the automatic door apparatus, and the sender being operative to send, to the administration center, a result on the self-diagnosis with information relating to occurrence of the abnormality attached thereto when the result on the self-diagnosis includes the information relating to occurrence of the abnormality, the administration center being communicatively connected with an information terminal device of a maintenance station which is assigned to carry out maintenance service of the automatic door apparatus, and the administration center being operative to send the information relating to occurrence of the abnormality and the self-diagnosis result attached thereto to the information terminal device of the maintenance station which is designated in advance based on the apparatus identification information for the automatic door apparatus that sends the administration center the information relating to occurrence of the abnormality and the self-diagnosis result attached thereto; and
wherein part or all of the stored operating information, or a result on prediction of a possible malfunction is transmittable through the information terminal device of the maintenance station to the maintenance station in response to a request for reading out the operating information or outputting the result of prediction of the possible malfunction.

11. An automatic door apparatus comprising:
a door operating mechanism having a motor for opening and closing a door;
a sensor for detecting presence of an object;
a controller for driving the motor of the door operating mechanism based on a signal outputted from the sensor to open and close the door;
an operating information extractor which extracts repeatedly at predetermined time intervals, from the controller, operating information of the automatic door apparatus including sensor state information indicating a detected state of the sensor and door state information indicating an open/close control state of the door, the door state information being cooperatively associated with the sensor state information; and
a memory device which time-sequentially stores the operating information repeatedly extracted by the extractor, the operating information being stored in an order of extracted time from a current time back for a predetermined period.

12. The apparatus according to claim 11, wherein the operating information includes signal information which is communicable between the controller and an external apparatus electrically connected with the controller.

13. The apparatus according to claim 11, wherein the automatic door apparatus function of self-diagnosing malfunction or abnormality of the automatic door apparatus with the sensor or its equivalent while storing a result of the self-diagnosis in a memory, and the extractor is operative to extract the self-diagnosis result from the memory as the operating information for storing the self-diagnosis result in the memory device in time-series.

14. The apparatus according to claim 11, further includes a monitor which monitors a malfunction, and the extractor extracts an operation history of the automatic door apparatus from the controller for storage in the memory device.

15. The apparatus according to claim 11, wherein the extractor extracts an altered designated value when the designated value set in the automatic door apparatus is altered for storage in the memory device.

16. An automatic door apparatus comprising:
a door open/close mechanism having a motor for opening and closing a door;
a sensor for detecting an object;
a controller for driving the motor of the door open/close mechanism based on a signal outputted from the sensor to open and close the door;
an operating information extractor which extracts, from the controller, a sensor state information indicating a detected state of the sensor and a door state information indicating an open/close control state of the door, as operating information of the automatic door apparatus, the door state information being cooperatively associated with the sensor state information; and
a memory device which sequentially stores the operating information extracted by the extractor in time-series, wherein the extractor updates contents stored in the memory device at a predetermined cycle.

17. An automatic door apparatus comprising:
a door open/close mechanism having a motor for opening and closing a door;
a sensor for detecting an object;
a controller for driving the motor of the door open/close mechanism based on a signal outputted from the sensor to open and close the door;
an operating information extractor which extracts, from the controller, a sensor state information indicating a detected state of the sensor and a door state information indicating an open/close control state of the door, as operating information of the automatic door apparatus, the door state information being cooperatively associated with the sensor state information; and
a memory device which sequentially stores the operation information extracted by the extractor in time-series, wherein the extractor suspends overwriting of the operating information into the memory device when occurrence of malfunction is detected in the automatic door apparatus, and retains the operating information and the self-diagnosis result before the detection of the occurrence of the malfunction in the memory device.

* * * * *